Aug. 29, 1944. P. M. FLEURIEL 2,356,758
APPARATUS FOR DEHYDRATING LIQUID COATING PRODUCTS AND THE LIKE
Filed Dec. 4, 1942
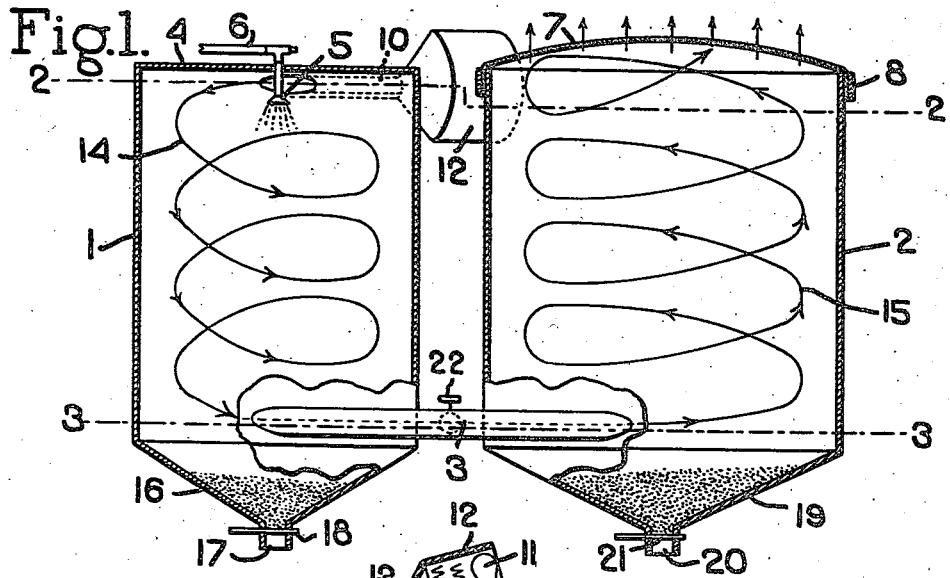
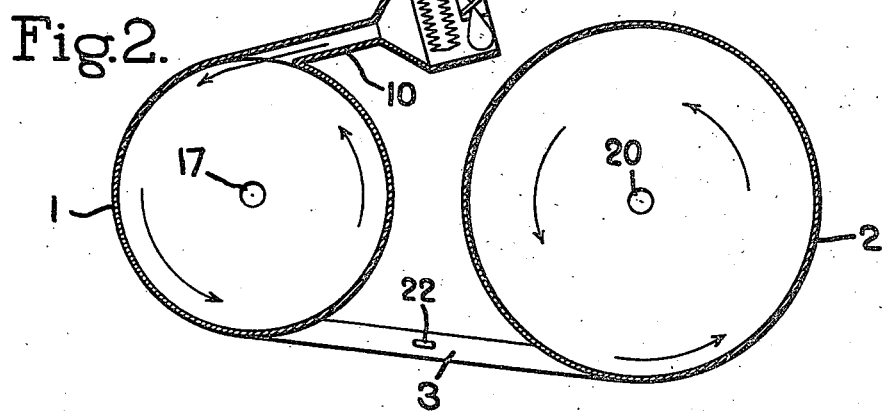
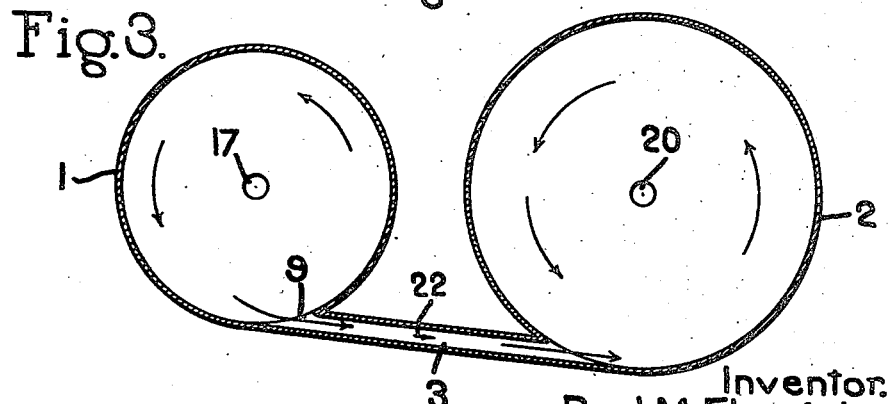
Inventor.
Paul M. Fleuriel
by Heard Smith & Tennant
Attys.

Patented Aug. 29, 1944

2,356,758

UNITED STATES PATENT OFFICE 2,356,758

APPARATUS FOR DEHYDRATING LIQUID COATING PRODUCTS AND THE LIKE

Paul M. Fleuriel, Stow, Mass., assignor to Union-Baystate Co. Inc., Cambridge, Mass., a corporation of Massachusetts Application December 4, 1942, Serial No. 467,851

3 Claims. (Cl. 159—4)

This invention relates to the manufacture of liquid coating products, such as liquid finishes for leather and other material, which comprise a pigment and other solid ingredients held in suspension in a liquid vehicle, usually a more or less volatile vehicle which will evaporate when exposed to the air or when subjected to the action of a heated drying medium.

Such liquid coating products are universally packaged and sold in ready-to-use liquid form, and in this form the liquid vehicle constitutes a considerable proportion of the weight and bulk or volume of any given quantity of the product.

One of the objects of my invention is to provide a novel apparatus for treating such liquid coating products so as to remove the liquid vehicle, and in so doing, leaving the solid ingredients in the form of a powder, each particle of which contains all the solid ingredients of the liquid coating product and in the same proportions as they exist in the ready-to-use form of the product.

Such powder can be packaged and shipped for a fraction of the cost of packaging and shipping the equivalent amount of ready-to-use liquid coating, and can be readily converted into a liquid coating ready for use by simply stirring a given quantity of the powder material into the correct quantity of liquid vehicle. Since each particle of the powder contains all the ingredients of the ready-to-use liquid product except the liquid vehicle, and in the same proportion as they exist in the ready-to-use product, the mere operation of stirring the powder into the correct proportion of liquid vehicle will produce a homogeneous product without the necessity of subjecting the powder or the liquid product to any grinding operation.

In order to give an understanding of the invention, I have illustrated in the drawing a selected embodiment thereof which will now be described after which the novel features will be pointed out in the appended claims.

In the drawing:

Fig. 1 is a vertical sectional view of a dehydrating apparatus embodying my invention.

Fig. 2 is a plan view with a part broken out.

Fig. 3 is a section on the line 3—3, Fig. 1.

In the drawing 1 and 2 indicate two dehydrating chambers both of which are preferably cylindrical in shape. The dehydrating chamber 1 constitutes what I will refer to as a primary dehydrating chamber, while the chamber 2 constitutes what will be referred to as a secondary dehydrating chamber. These two chambers are connected at their lower ends by means of a pipe or conduit 3 which leads into each chamber in a tangential direction as best seen in Fig. 3.

The primary chamber 1 is closed at its top as shown at 4 and is provided with a spray nozzle 5 which communicates with a suitable supply pipe 6. Said spray nozzle may be of any desired construction but will preferably be a nozzle which will deliver liquid from the pipe 6 into the chamber 1 in the form of a fine spray composed of minute droplets.

The secondary dehydrating chamber 2 has its upper end closed by means of a diaphragm 7 in the form of a dust filter. This diaphragm 7 may be made of any suitable material which will permit the passage therethrough of gaseous medium but will prevent the passage therethrough of any solid matter even in the form of a fine dust. The diaphragm 7 may be secured to the chamber 2 in any appropriate way as by means of the clamping band 8 which encircles the chamber 2 and by means of which the peripheral portion of the filter member 7 is clamped to the outside of the chamber 2.

Means are provided for delivering a gaseous drying medium under pressure into the upper end of the primary dehydrating chamber 1, such drying medium being so delivered into the chamber that it will have a whirling movement in the chamber as it moves downwardly through said chamber to the outlet opening 9 leading to the conduit 3. For this purpose there is provided an inlet pipe 10 which leads into the upper end of the primary dehydrating chamber 1 in a tangential direction and through which the heated drying medium is delivered to said chamber. This drying medium may be heated and placed under pressure by any approved means. For this purpose, I have indicated a fan or blower 11 which is mounted in a housing 12 and which delivers the drying medium under pressure to the pipe 10. 13 indicates a suitable heater element over or through which the drying medium is forced by the fan or blower 11 thereby heating the drying medium to the desired temperature.

The heated drying medium which is delivered into the primary dehydrating chamber 1 through the pipe 10 will have a whirling motion in said chamber as indicated by the scroll line 14, the arrows applied to said line indicating the direction of the whirling movement of the heating medium.

As stated, the spray or atomizing nozzle 5 delivers the liquid to be treated into the upper end of the dehydrating chamber 1 in the form of a fine spray or mist composed of minute droplets, which are picked up by this whirling high velocity current and are thus carried around in the chamber 1 with a whirling motion.

The gaseous drying medium with its entrained droplets of the liquid being treated gradually flows downward in the primary chamber 1 during its whirling movement and is discharged through the discharge port 9 and conduit 3 into the lower end of the larger secondary dehydrating chamber 2.

Since the conduit 3 delivers into the secondary dehydrating chamber 2 in a tangential direction, the drying medium issuing from the conduit 3 will have a whirling motion in said secondary chamber 2 as indicated by the scroll line 15, and this drying medium will have a gradual upward progress through the chamber 2 and will finally filter through the filter member 7 at the top of the chamber as shown by the arrows.

Assuming that the liquid which is being sprayed from the nozzle 5 is a liquid coating product comprising pigment and other solid ingredients held in suspension in a liquid vehicle, each minute droplet which is delivered from the spray nozzle 5 will contain all the ingredients of the liquid coating material in the same proportion as they exist in the product before it is broken up into minute droplets by the spray, that is, each droplet will contain all the solid ingredients of the liquid coating held in suspension in a droplet of the liquid vehicle and in the same proportion that they exist in the larger quantity of liquid coating.

As each of these minute droplets is circulated through the primary drying chamber by the whirling current of drying medium, the liquid vehicle of each droplet is gradually evaporated, and when the liquid vehicle of each droplet has been completely evaporated, the residue will be a minute or small particle of solid matter which contains all the solid ingredients of the ready-to-use liquid coating and in the same proportion as these ingredients exist in such ready-to-use coating.

The solid residue of any droplet which is completely dehydrated in the primary drying chamber 1 may gravitate to the bottom 16 of said chamber or may remain entrained in the gaseous drying medium along with droplets that are not entirely dehydrated and thus be carried over into the bottom of the dehydrating chamber 2 through the conduit 3. The bottom 16 of the chamber 1 is in the form of a dust collector and is provided with an opening 17 normally closed by a closure 18 and through which the accumulated dust particles can be removed.

Because of the tangential arrangement of the conduit 3 with relation to the chamber 2, the stream of gaseous drying medium entering the chamber 2 through said conduit will have a whirling motion in the chamber, and because the upper end of said chamber 2 is closed with a filtering diaphragm 7, the whirling current of drying medium in said chamber 2 will have a gradually rising movement. The dehydrating action of the minute droplets continues and is completed in the chamber 2.

Inasmuch as said secondary dehydrating chamber 2 is of somewhat larger diameter than the dehydrating chamber 1, the whirling current of gaseous medium in the secondary chamber 2 will have a reduced speed as compared with the speed of the whirling motion in the primary dehydrating chamber, and this reduction of speed is such that each solid particle constituting the residue of a dehydrated droplet will gradually settle to the bottom 19 of said dehydrating chamber 2.

Said chamber 2 is provided with a discharge opening 20 in its bottom normally closed by a removable closure 21 and through which the dehydrated particles accumulating in the bottom 19 of the chamber may be removed.

Because of the reduced velocity of the current of drying medium in the secondary dehydrating chamber 2, the dust particles have an opportunity to become cooled somewhat while they are settling out of the whirling current and thus the chamber 2 constitutes not only a secondary dehydrating chamber but also a cooling chamber.

22 indicates a damper or valve in the conduit 3 by which the flow of the gaseous medium therethrough can be regulated. By partially closing this damper or valve so as to cut down the free flow of gaseous medium therethrough, the individual droplets delivered from the spray 5 will be retained in the primary dehydrating chamber for a longer period of time than when the valve 22 is fully opened.

The provision of this valve or damper 22 makes it possible to use the apparatus for drying or dehydrating materials having different specific gravities. When dehydrating material with a high specific gravity, the valve 22 will be partially closed thus restricting the flow of gaseous medium through the conduit 3. In this way, the higher specific gravity of the material will be offset by the back pressure thus built up in the dehydrating chamber 1, and the individual droplets will be prevented from settling too rapidly in said chamber 1 or from being carried into the secondary chamber 2 prematurely.

In this way it is possible to so regulate the movement of the droplets and particles downwardly through the primary chamber 1 and upwardly through the secondary chamber 2 that all droplets or particles will be completely dried before they settle out of the upwardly moving air current in chamber 2.

For drying material having a relatively light specific gravity, the valve 22 may be fully opened or so positioned as to only slightly restrict the movement of the drying medium through the conduit 3. The minute particles of the material having a light specific gravity do not tend to move downwardly in the chamber 1 as rapidly as the particles having a heavier specific gravity, and therefore, when drying material of a relatively light specific gravity, the damper 22 may be adjusted to permit a freer flow of the gaseous medium.

Since each particle of the powder material which accumulates in the lower end of the dehydrating chambers contains all the solid ingredients of the ready-to-use liquid coating and in the same proportion in which these ingredients are found in said liquid coating, a liquid coating product similar to that which was fed to the spray nozzle 5 can be produced by simply stirring a given quantity of powder with the correct amount of liquid finish and without the necessity of subjecting the product to any grinding or similar operation to secure a homogeneous mixture.

I claim:

1. A dehydrating apparatus comprising a primary cylindrical dehydrating chamber, means to deliver heated gaseous drying medium under pressure into the upper end of said chamber in a tangential direction, means to deliver the liquid to be dehydrated into the upper end of said chamber in the form of a spray, a secondary cylindrical dehydrating chamber of larger diameter than that of the primary dehydrating chamber, and a conduit connecting the lower end of the primary dehydrating chamber to the lower end of the secondary dehydrating chamber and having a tangential relation to both chambers, said secondary dehydrating chamber having its upper end closed by a filtering diaphragm, whereby said drying medium with its entrained droplets of the liquid flows downwardly through the primary dehydrating chamber with a rapid whirling movement and flows upwardly through the secondary dehydrating chamber with a whirling movement of decreased velocity.

2. A dehydrating apparatus comprising a primary cylindrical dehydrating chamber, means to deliver heated gaseous drying medium under pressure into the upper end of said chamber in a tangential direction, means to deliver the liquid to be dehydrated into the upper end of said chamber in the form of a spray, a secondary cylindrical dehydrating chamber of larger diameter than that of the primary dehydrating chamber, and a conduit connecting the lower end of the primary dehydrating chamber to the lower end of the secondary dehydrating chamber and having a tangential relation to the latter.

3. A dehydrating apparatus comprising a primary cylindrical dehydrating chamber, means to deliver heated gaseous drying medium under pressure into the upper end of said chamber in a tangential direction, means to deliver the liquid to be dehydrated into the upper end of said chamber in the form of a spray, a secondary cylindrical dehydrating chamber of larger diameter than that of the primary dehydrating chamber, a conduit connecting the lower end of the primary dehydrating chamber to the lower end of the secondary dehydrating chamber and having a tangential relation to the latter, and means for controlling the flow of heated gaseous drying medium through said conduit.

PAUL M. FLEURIEL.